Sept. 17, 1968    F. KESSELRING ET AL    3,402,324
SYNCHRONOUS SWITCHING DEVICE
Filed June 14, 1966
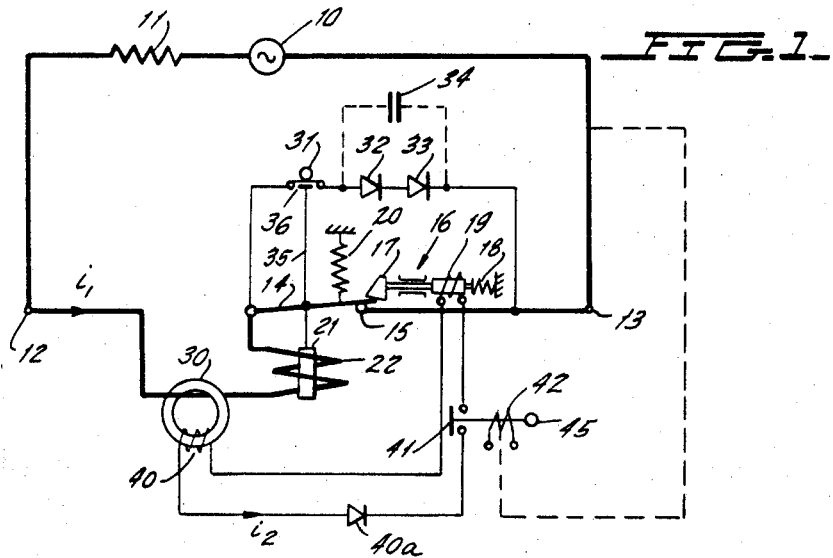
FIG. 1.
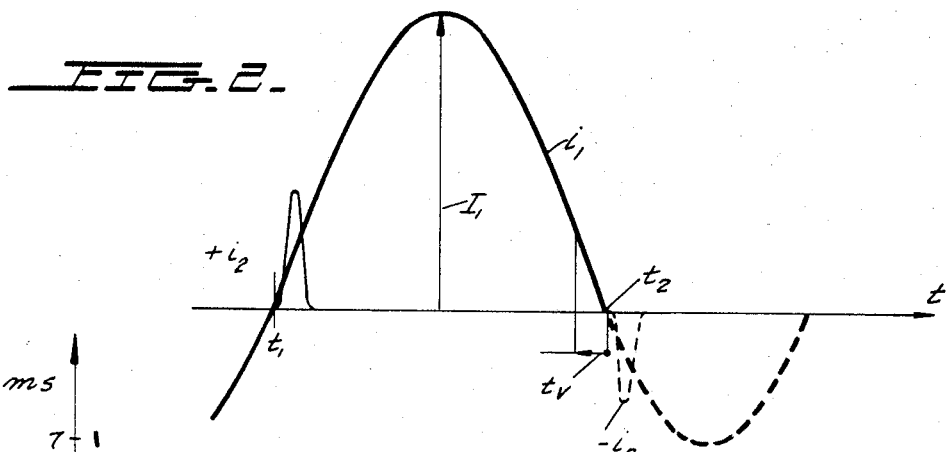
FIG. 2.
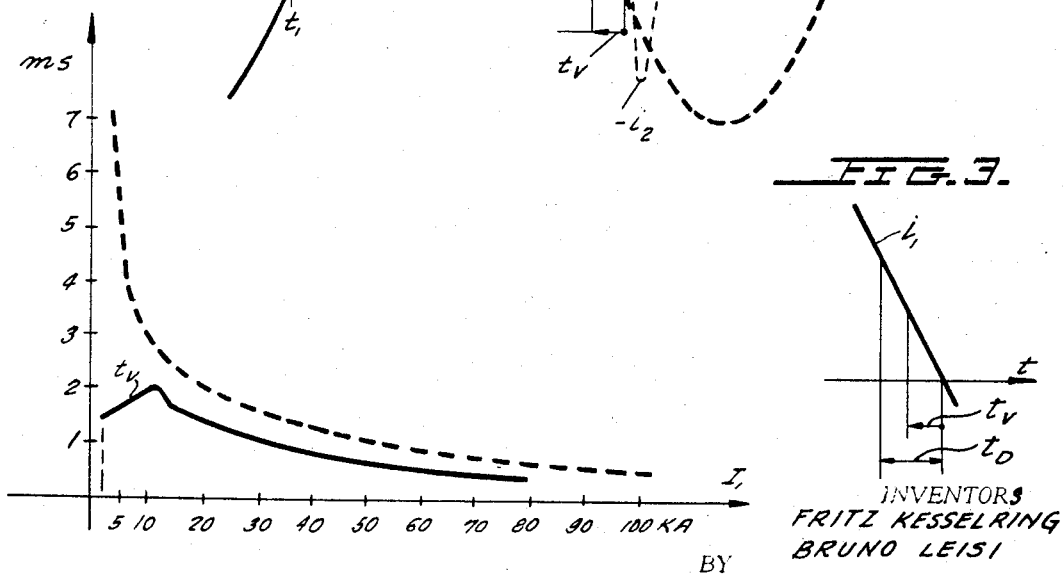
FIG. 3.
FIG. 4.
INVENTORS
FRITZ KESSELRING
BRUNO LEISI
BY
OSTROLENK, FABER, GERB & SOFFEN
ATTORNEYS

United States Patent Office 3,402,324
Patented Sept. 17, 1968

3,402,324
SYNCHRONOUS SWITCHING DEVICE
Fritz Kesselring, Kusnacht, Zurich, and Bruno Leisi, Geroldswill, Zurich, Switzerland, assignors to Siemens Aktiengesellschaft, Erlangen, Germany, a corporation of Germany
Filed June 14, 1966, Ser. No. 557,505
Claims priority, application Germany, June 24, 1965, S 97,839
3 Claims. (Cl. 317—11)

This invention relates to circuit interrupter devices, and more particularly relates to a novel circuit interrupter device having main contacts which open slightly prior to a current zero, with the contacts automatically reclosing in the event of an unsuccessful interruption operation.

Synchronous-type circuit breakers are generally well known in the art, and have the major advantage of opening at or just prior to a current zero value, thereby eliminating substantial power arcs and the need for apparatus capable of handling and extinguishing arcs.

The principle of the present invention is to provide a circuit in parallel with the main current-carrying contact of the interrupter where the parallel circuit includes an auxiliary contact in series with a rectifying device. A novel magnetic operating circuit is then provided which is activated responsive to a fault condition where the magnetic operating circuit releases the main contact immediately prior to a current zero value and thereafter, in the next half cycle when the reverse current is blocked by the rectifier in the parallel circuit, opens the auxiliary contact to obtain complete circuit interruption.

Accordingly, a primary object of this invention is to provide a novel synchronous circuit breaker having a main contact movable to an open position just prior to a current zero value.

Another object of this invention is to provide a novel magnetic operating circuit for synchronous circuit breakers which operates the main contact and an auxiliary parallel contact in series with a rectifier in a predetermined sequence.

These and other objects of this invention will become apparent from the following description when taken in connection with the drawings, in which:

FIGURE 1 is a circuit diagram of an interrupter constructed in accordance with the present invention.

FIGURE 2 illustrates current as a function of time for the main current flowing through the circuit interrupter of FIGURE 1.

FIGURE 3 illustrates an enlarged section of FIGURE 2 in the time region during which the main contact is to be opened.

FIGURE 4 illustrates the shape of the pre-trip time characteristics as a function of peak fault current.

It is well known that a rectifier can be placed in parallel with a circuit breaker contact to assist in the opening of a circuit. In such arrangements, however, the rectifier must be capable of carrying the full short circuit current to be interrupted with the circuit breaker contacts opened during the time that the rectifier conducts in its forward direction. A contact connected in series with the rectifier is then opened during the next half cycle when the rectifier blocks in order to completely remove the interrupter from the circuit.

Such arrangements, however, have in the past been suitable only for relatively low current circuit breakers because of the complexity and expense of parallel rectifiers which are capable of carrying high currents which could be of the order of 50,000 amperes.

In accordance with the present invention, a novel magnetic operating system is applied to this general type arrangement where the main contacts are opened only slightly prior to a current zero value, whereby the current shunted through the parallel circuit including the rectifier is of a relatively low magnitude regardless of the peak current values which flow in the circuit.

Suitable magnetic operating circuits which could serve this function are also known in other fields such as in the field of the electromagnetically operated rectifier where a contact is opened and closed in synchronism with the frequency of an AC source, thereby to deliver a DC output voltage. Such arrangements, however, were never conceived for use with a circuit interrupter device in which AC current constantly passes through the main circuit.

The novel circuit of the invention is illustrated in FIGURE 1 wherein an AC source 10 is connected in series through a load 11 to terminals 12 and 13 of the synchronous circuit interrupter.

The interrupter is comprised of a movable contact 14 which is movable into and out of engagement with a stationary contact 15 and is latched in a closed position by a latch mechanism 16 which includes an axially movable slider 17 which is biased to the left by a biasing spring 18 and is movable under control of the solenoid coil 19.

A biasing spring 20 is further connected to the movable contact 14 and biases movable contact 14 open against the force of latch 17.

A magnetic operating circuit for moving contact 14 to a disengaged position is then provided which includes a movable magnet 21 disposed in winding 22 which is connected in series with contact 14. Coil 21 is further connected to a straight-through winding portion extending through saturable reactor 30 and terminating at terminal 12. The stationary contact 15 is then connected directly to terminal 13, as illustrated.

A parallel circuit is then provided for contacts 14 and 15 which includes auxiliary contact 31 and diodes 32 and 33. The number of diodes to be used depends on the reverse voltage of source 10 and should be sufficiently high to withstand the maximum reverse voltage which could exist in the system. If desired, a capacitor 34 can be connected in parallel with diodes 32 and 33 to control transients which appear across these diodes.

An arm 35 extending from contact 14 and thus from movable magnet 21 is terminated with a head 36 which is movable into and out of engagement with contact 31 in order to move the contact 31 to its disengaged position after head 36 has travelled a predetermined distance. That is to say, contact 31 is normally closed and will remain closed until contact 14 has opened sufficiently for head 36 to engage contact 31 and move it to its disengaged position.

An auxiliary winding 40 is then connected to the saturable reactor 30 with the winding 40 connected in series with diode 40a, contact 41 and solenoid winding 19. Contact 41 is a normally open contact, and is closed responsive to energization of coil 42. Coil 42 can be any suitable type of trip coil and can be energized responsive to some predetermined current condition in the circuit to be protected, as indicated by the dotted line connecting coil 14 and the circuit being protected. Note, however, that contact 41 can also be manually operated by the manual handle 45.

The operation of the circuit of FIGURE 1 is best understood as follows and is taken with reference to FIGURES 2, 3 and 4:

In order to open the interrupter, contact 41 is closed either due to the measurement of some predetermined circuit condition in the circuit being protected or by manual operation. A current $i_2$ flows in the circuit including contact 41 and coil 19 only when the current $i_1$ which is to be interrupted increases in a positive direction through zero with the saturable reactor 30 unsaturating at time $t_1$ and the voltage induced in coil 40 being in the proper direction to force current through diode 40a. Note that the current $i_2$ decreases toward zero in FIGURE 2 after the reactor 30 saturates.

As schematically illustrated in FIGURE 2 in the dotted line $-i_2$, the diode 40a clips this pulse in the next half cycle.

The energization of coil 19 moves latch 17 to the right with a time delay, for example, of 4 milliseconds where a half cycle is approximately 8 milliseconds long in a 60 cycle system. This time delay is due to the inertia of latch 17 and prevents latch removal until the current in coil 22 is high enough to hold contact 14 closed against the biasing force of spring 20.

However, contact 14 is still held closed against the opening force of spring 20 by the current in coil 22. The current in coil 22 decreases as the current $i_1$ drops toward zero, and at the beginning of time interval $t_V$ in FIGURE 2, the current reduces below a value sufficient to overcome the biasing force of spring 20 so that contact 14 begins to open. Note that during this opening time there will be substantially no arcing between contacts 14 and 15, since the only voltage across contacts 14 and 15 is the forward voltage drop of rectifiers 32 and 33 with the current flow through contacts 14 and 15 being shunted through these rectifiers. Therefore, rectifiers 32 and 33 carry forward current only in the shaded current-time area shown in FIGURE 2 so that the current duty on the rectifiers will be seen to be relatively low and independent of the peak current value of current $i_1$.

Once the current $i_1$ reaches zero at time $t_2$, the current through rectifiers 32 and 33 reaches zero. At the same time and slightly after this current zero value, head 36 reaches contact 31 and opens contact 31. This action occurs during the time that rectifiers 32 and 33 are in their blocking condition so that the only current interrupted by contact 31 will be the reverse leakage current of rectifiers 32 and 33. Thereafter, the circuit is completely open.

From the foregoing, it will be seen that it is desirable to have a certain amount of inertia built into the latching mechanism including latch 17 so that by the time latch 17 is removed from contact 14, a sufficiently high current will be flowing in coil 22 to hold contact 14 closed against spring 20.

If a small delay latching action is desired, however, it is possible to pre-magnetize core 30 with a suitable DC bias which will operate to produce opening pulse $i_2$ at some later time during the cycle, thereby to insure sufficient current to coil 22 to hold contact 14 closed until just prior to the next current zero. It is important, however, that this opening pulse $i_2$ be produced while the current $i_1$ increases so that rectifier 40a will conduct in its forward direction to operate solenoid coil 19.

The so-called pretrip time $t_V$, shown in FIGURE 2, is reproduced in FIGURES 3 and 4 in conjunction with a limiting time $t_D$ which should preferably not be exceeded by the pre-trip time $t_V$ when using, for example, a 200 ampere silicon diode to serve the function of diodes 32 and 33.

FIGURE 4 illustrates the limiting curve for the time $t_D$ as a function of peak current $i_1$ of the current to be interrupted. It will be noted that the pre-trip time $t_V$ varies slightly over the range, but always falls within the limiting curve $t_D$ in FIGURE 4 when using the novel circuit of the invention.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. An AC circuit interrupter device comprising a movable contact movable into and out of engagement with a cooperating contact; said movable contact and cooperating contact connected in series with AC conductor means connectable to an AC circuit; biasing means connected to said movable contact and biasing said movable contact out of engagement with said cooperating contact; latch means connected to said movable contact and having a latching position and a latch release position; said latch means latching said movable contact engaged against the biasing force of said biasing means when said latch is in its said latching position; an electrically operable latch release means connected to said latch means for moving said latch means to its said latch release position responsive to energization of said latch release means; a winding and a signal generating means connected in series with said movable contact and said AC conductor; a movable body of magnetic material positioned in proximity to said winding to be moved in accordance with the current magnitude through said winding; said signal generating means connected to said electrically operable latch release means; said movable body connected directly to said movable contact and being moved in a direction to hold said movable contact in its said engaged position when the current through said winding exceeds a predetermined value; a lost motion means; a normally closed auxiliary contact and a rectifier; said auxiliary contact and rectifier connected in series with one another and in parallel with said movable contact; said lost motion means connecting said movable body to said auxiliary contact after said movable contact is opened to subsequently move said auxiliary contact to a disengaged position; said signal generating means generating an output signal only when the current through said movable contact begins to rise in a positive direction, thereby to energize said latch release means; said latch release means moving to its said latch release position by the time the current through said winding is sufficiently high to apply a holding force from said movable body to hold said movable contact closed against the force of said biasing means; said movable contact opening when said current through said winding decreases in the later part of said position cycle to below said predetermined current whereby the instantaneous current through said movable contact is shifted to said parallel connected auxiliary contact and rectifier in the forward conduction direction of said rectifier; said auxiliary contact opening prior to the reversal of said current in a negative direction through said lost motion mechanism.

2. The device as set forth in claim 1 wherein said signal generating means includes a saturable reactor connected in series with said AC conductor, an output winding on said saturable reactor connected in series with a diode and said electrically operable latch release means; said diode connected to pass pulses from said output winding only in the positive half cycle of current flow through said AC conductor.

3. The device as set forth in claim 1 which includes a normally open trip contact in series with said signal generating means; and operating means connected to said normally open trip contact to close said trip contact to initiate opening of said movable contact in the next positive half wave.

References Cited

UNITED STATES PATENTS

| | | | |
|---|---|---|---|
| 2,425,570 | 8/1947 | Scheg et al. | 307—133 X |
| 2,746,003 | 5/1956 | Wegener. | |
| 2,782,345 | 2/1957 | Kesselring. | |
| 2,849,659 | 8/1958 | Kesselring. | |

ROBERT K. SCHAEFER, *Primary Examiner.*

T. B. JOIKE, *Assistant Examiner.*